Figure 3:
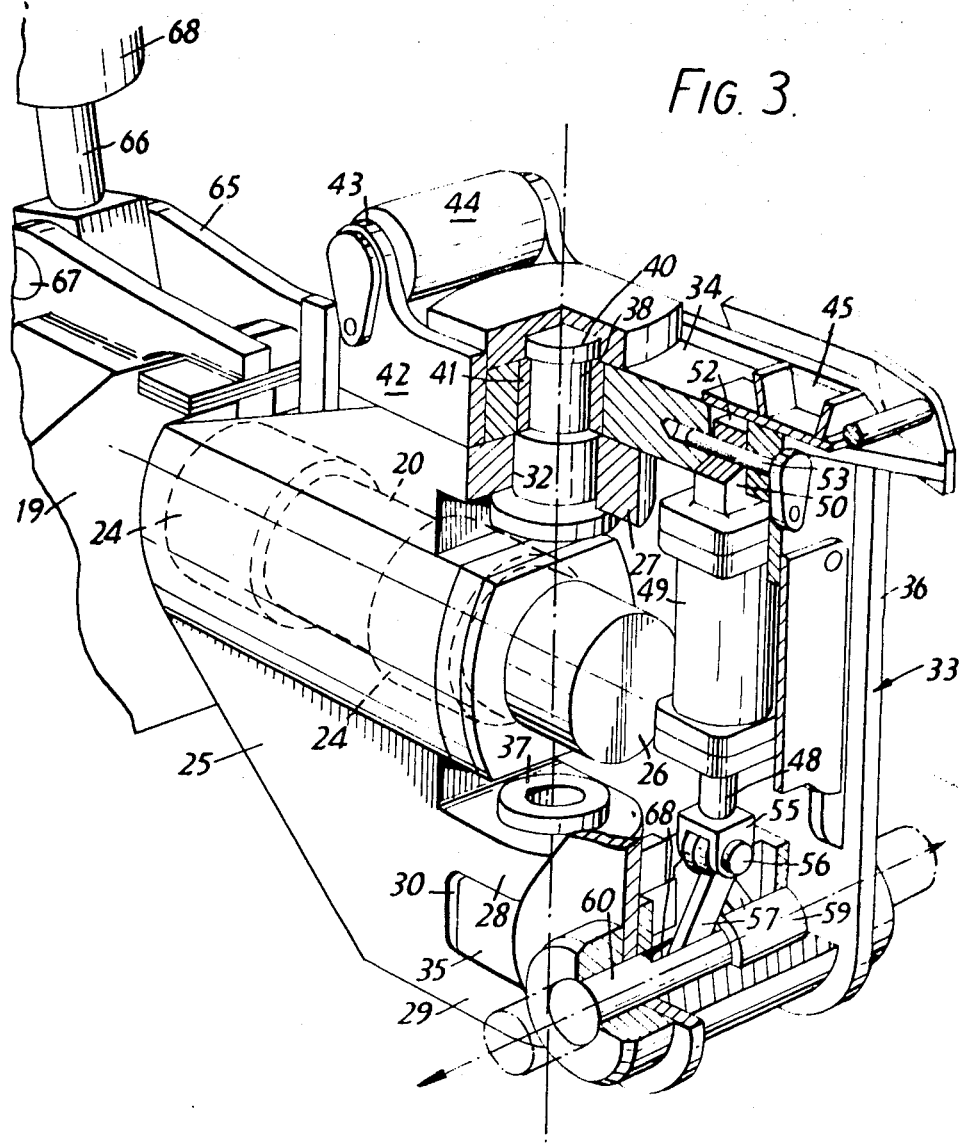

United States Patent

[11] 3,620,551

| [72] | Inventor | David J. B. Brown<br>Stroud, England |
| --- | --- | --- |
| [21] | Appl. No. | 835,031 |
| [22] | Filed | June 20, 1969 |
| [45] | Patented | Nov. 16, 1971 |
| [73] | Assignee | Winget Limited<br>Rochester, Kent, England |

[54] TRAILER COUPLINGS
2 Claims, 5 Drawing Figs.

| [52] | U.S. Cl. | 280/479,<br>280/421, 280/429, 280/475, 280/492 |
| --- | --- | --- |
| [51] | Int. Cl. | B60d 1/00 |
| [50] | Field of Search | 280/479 A,<br>492, 429, 475 |

[56] References Cited
UNITED STATES PATENTS

| 3,124,372 | 3/1964 | Poole | 280/492 X |
| --- | --- | --- | --- |

FOREIGN PATENTS

| 1,014,954 | 12/1965 | Great Britain | 280/479.3 |
| --- | --- | --- | --- |
| 102,184 | 7/1963 | Norway | 280/479 |

*Primary Examiner*—Benjamin Hersh
*Assistant Examiner*—John A. Pekar
*Attorney*—Mason, Kolehmainen, Rathburn & Wyss

ABSTRACT: A coupling for interconnecting wheeled vehicles, such as a tractor and a trailer. The coupling is of two parts, one part being movable between coupled and uncoupled positions with the other part. Preferably one part is pivotally mounted on a tractor and provides for movement about both vertical and horizontal axes.

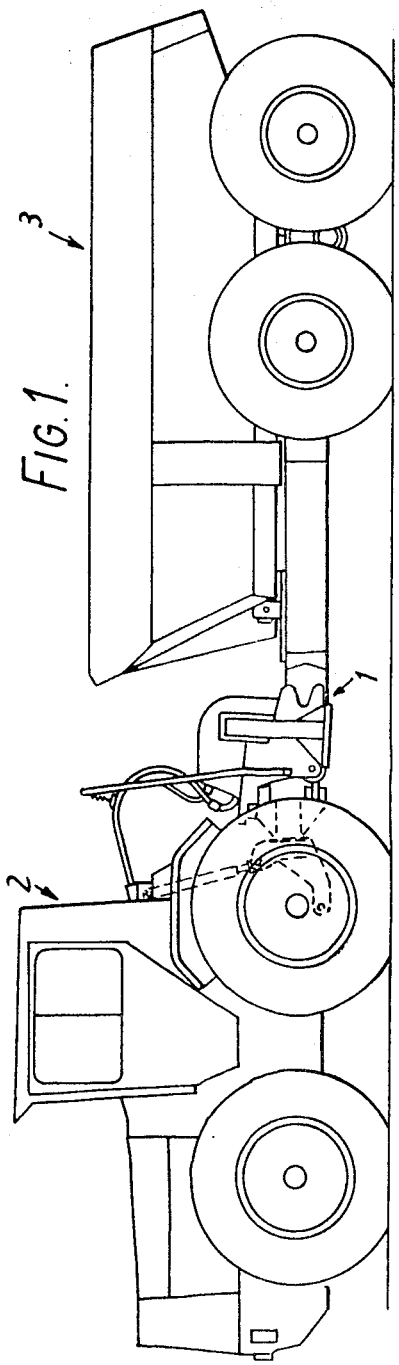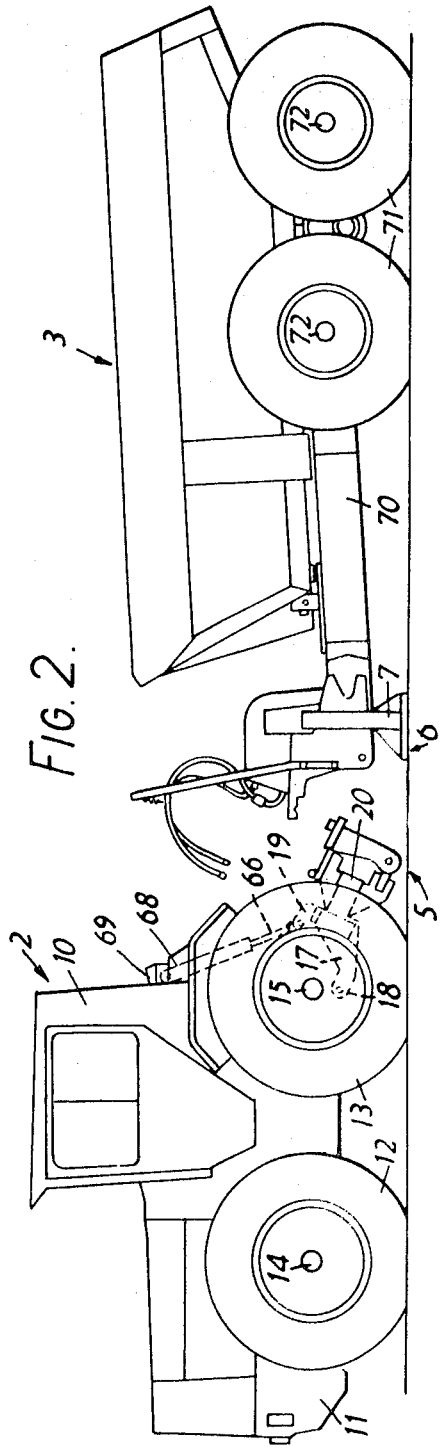

INVENTOR:
DAVID JOHN BOWES BROWN
By Mason, Kolehmainen, Rathburn & Wyss
Attorneys

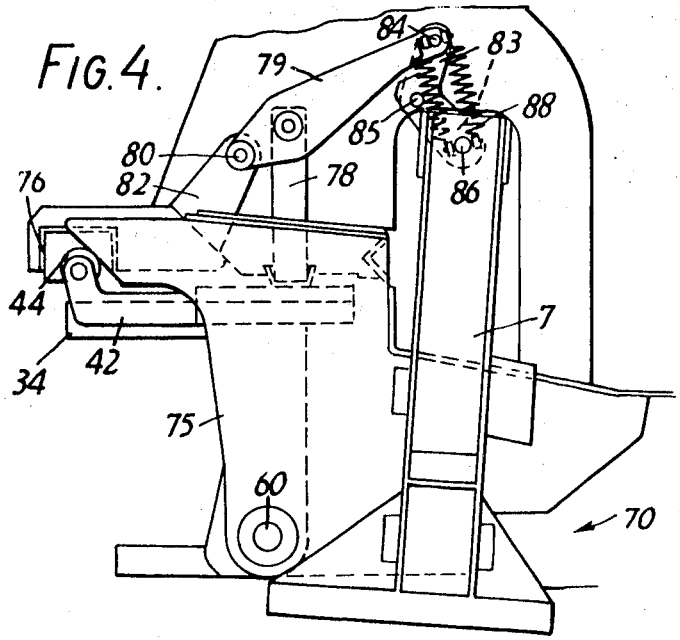
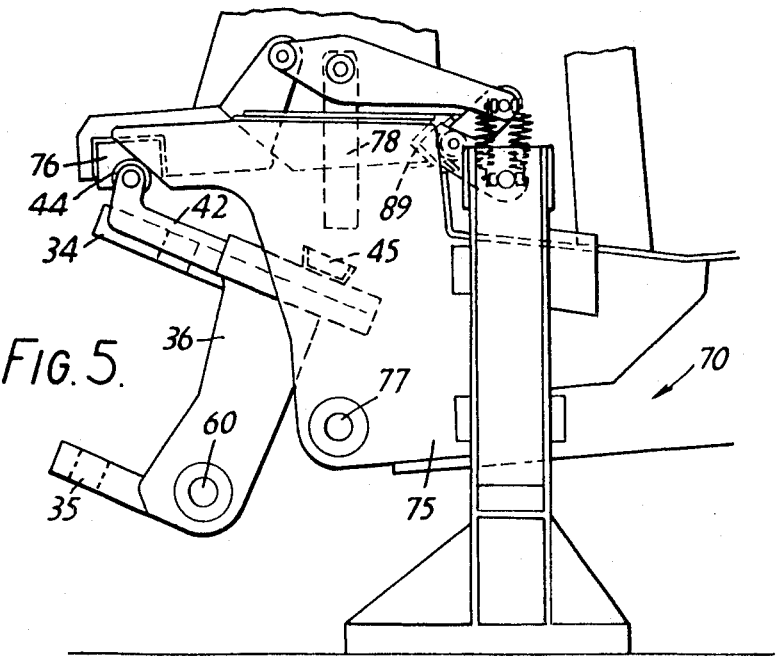

TRAILER COUPLINGS

This invention relates to couplings for interconnecting wheeled vehicles and in particular for connecting driven vehicles, such as tractors, to trailers.

When a tractor and a trailer are being used on undulating ground it is necessary for a coupling to permit considerable movement between the tractor and the trailer and at the same time a trailer carrying a heavy load may have a bad effect on the drive of the tractor so as to reduce the effective grip between the wheels and the surface over which the tractor is moving.

It is among the objects of the present invention to provide a coupling which overcomes or reduces these disadvantages.

According to the present invention there is provided a coupling for interconnecting wheeled vehicles, comprising a first member having means for pivotal attachment to a first vehicle, such as a tractor, a second member having means for attachment to a second vehicle, such as a trailer, and means for raising the first member into coupling engagement with the second member or for lowering the first member to release the coupling with the second member.

The invention will now be described by way of example with reference to the accompanying drawings in which:

FIG. 1 shows a tractor and trailer interconnected by a coupling according to the present invention, FIG. 2 is a view similar to FIG. 1 with the coupling in the disconnected position, FIG. 3 is an enlarged partly sectional view in perspective showing that part of the coupling attached to the trailer as shown in FIGS. 1 and 2, FIG. 4 is a view showing part of the coupling in the position shown in FIG. 1 on an enlarged scale, and FIG. 5 is a view similar to FIG. 4 showing the coupling partly engaged.

In the drawings reference is made to a tractor and trailer but as will be appreciated the coupling may be used to interconnect any type of vehicles.

In FIG. 1 the coupling 1 is shown in the operative position interconnecting a tractor 2 and a trailer 3. FIG. 2 shows the same coupling 1 in the disconnected position and from this it is clear that the coupling is of two parts. One part 5 being attached to the tractor 2 and shown in the lowered position towards the ground and a second part 6 attached to the trailer 2 which includes a jack or foot 7 for supporting the forward end of the trailer 3.

The tractor 2 has a driving cab 10 mounted on a chassis 11 which is supported by wheels 12, 13 carried by front and rear axles 14 and 15 respectively. The rear axle 15 carries the part 5 of the coupling which has a pair of sidearms 17 pivotally attached at one end to the tractor by pivot pins 18. The sidearms 17 project rearwardly to carry between their free ends a crossmember 19 from which extends a rearwardly projecting spigot 20. The spigot 20 carries a pair of bearing sleeves 24 mounted in spaced relation which support a body member 25 which is held in position on the spigot by a locking cap 26. Appropriate greasing facilities (not shown) are provided in the known manner for enabling grease to be supplied to the space between the spigot 20 and the interior of the body member 25. The body member 25 has three projecting arms 27, 28 and 29 mounted in substantially vertical alignment. The arms 27, 28 and 29 are mounted such that the upper arm 27 is spaced from the two lower arms 28 and 29 which provide a recess 30 between them and each arm has a bore 32, the axes of which are in alignment (not shown for arms 28 and 29).

Cooperating with the body member 25 is a further member 33 which is of substantially C-shape having arms 34 and 35 interconnected by an upright 36. The lower arm 35 is located in the recess 30 between the lower arms 28 and 29 of the body member 25 with a bearing member 37 passing through the bores in the arms 28 and 29 and a bore (not shown) in the arm 35. The bearing member 37 is in the form of a bolt or spigot and is locked in position by a nut (not shown). The upper arm 34 of the member 33 is attached to the arm 27 by a bearing member 38 passing through the bores 32 and a bore 39 in the end of the arm 34. The bearing member 38 again is in the form of a bolt or spigot and is locked in position by a nut 40. Preferably a bearing sleeve 41 is provided in the bore 39 and a similar sleeve may be provided in the bores in the arms 28 and 29 respectively.

The arm 34 has a pair of sideplates 42 which provide at their forward ends upstanding ears 43 between which is carried a roller or profiled surface 44. A locating box 45 is provided on the arm 34 behind the roller and between the plates 42 the purpose of which will be described later.

The upright 36 of the member 36 is hollow and provides a space 47 for a pneumatic or hydraulic ram 48 and associated cylinder 49. The cylinder 49 has at its upper end a projecting lug 50 which projects into a recess 52 in the arm 34 and is retained therein by a pin 53. The lower end of the cylinder 49 is guided by lateral guide plates, not shown, which limit the lateral swing of the cylinder 49 about pivot 53, thus ensuring an even movement of the pins 60.

The ram 48 is slidably mounted in the cylinder 49 in a conventional manner and projects from the lower end. A lug 55 is carried by the free end of the ram 48 and is connected by a pivot pin 56 to one end of a pair of links 57. The free end of each link 57 passes through a slot 58 in a sleeve 59 carried in the lower part of the upright 36 to engage a locking pin 60. A locking pin 60 is mounted at each end of the sleeve 59 and on movement of the ram 48 the pins 60 are retracted into or extended from the sleeve by reason of the links 57.

The upper part of the crossmember 19 has a pair of plates 65 between which is mounted the free end of a pneumatic or hydraulic ram 66 by a pivot pin 67. The ram 66 is slidable in a cylinder 68 in a conventional manner and the upper end of the cylinder 68 is mounted for pivotal movement about a support bracket 69 carried by the rear axle and chassis of the tractor 2.

The trailer 3 which carries the second part 6 of the coupling 1 has a chassis 70 supported by wheels 71 mounted on axles 72. In the drawings the trailer chassis 70 is shown as carrying a tip-up body 73 but the trailer may be used for any purpose. The second part 6 comprises a housing 75 having a bearing surface provided by a recess 76 and a pair of bores 77 for engagement by the roller 44 and the locking pins 60 respectively of the first part 5 of the coupling. The locating box 45 of the first part 5 is engageable by the lower end of a push rod 78 which is carried between a pair of levers 79 each having one end connected by a pin 80 to a projection 82 on the housing 75 and the opposite ends connected by way of a pair of pivotal links 83 and pivot pins 84, 85 and 86 to the upper end of the foot 7. Springs 88 extend between the ends of the levers 79 and the upper end of the foot 7 to bias the links 83 into a folded position as shown in FIG. 5 which maintains a tension on the foot 7 when retracted as in FIG. 4. To prevent the foot collapsing there is provided a recess 89 in the housing 75 which receives the links 83.

In use, the tractor 2 is reversed towards the front of the trailer 3 and the first part 5 of the coupling 1 is raised by means of the hydraulic ram 66 and cylinder 68 into a position where the roller 44 engages within the recess 76 of the second part 6 of the coupling 1. On further upward movement of the first part 5 the locating box 45 moves into contact with the lowered part of the push rod 78 and, as the first part 5 is moved upwardly, the push rod 78 acts against the levers 79 so that the levers 79 pivot about the projection 82 and release the links 83 from the recess 89. The foot 7 is then raised as the first part 5 continues to rise, the trailer being supported by the roller 44 in the recess 76. When the bores 77 in the sides of the housing 75 of the second member are in alignment with the pins 60, air is supplied to the pneumatic cylinder 49 so that the ram 48 moves downwardly to extend the links 57 which move the pins 60 outwardly into the bores 77.

When it is required to disconnect the trailer from the tractor the pins 60 are withdrawn from engagement with the bores 77 of the housing 75 by actuating the cylinder 49 to withdraw the ram 48 which in turn moves the links 57 to retract the pins 60.

Next, the hydraulic ram 66 is extended from the cylinder 68 to lower the first part of the coupling in the downward direction about its associated pivot. During this movement the push rod 78 in contact with the locating box 45 moves downwardly and at the same time the foot 7 is lowered under gravity and the links 83 are biased by springs 88 into a folded position and engage the recess 89 to lock the foot 7 in the lowered position when the push rod 78 is free or nearly free from the locating box 45 and a ground reaction is applied to the base of the foot 7. On further lowering of the first part the roller 44 is freed from the recess 76 and the uncoupling is completed.

It will be appreciated that the various pneumatic and/or hydraulic pipelines are connected or disconnected, for example by quick disconnect couplings, as required during coupling and uncoupling. A warning device may be associated with the locking pins to inform the operator either audibly or visually when the locking pins are in the desired position and this may be associated with the links 57.

During movement of an interconnected tractor and trailer the spigot 20 projecting from the rear of the tractor permits rotation between the two parts of the coupling and the bearing members 37 and 38 permit turning of the tractor and trailer with respect of each other such as when turning corners. To stabilize and to prevent undue movement between the coupling parts spring-loaded swivel stops may be provided.

When two vehicles are coupled together the driver of the driven vehicle may transfer part of the load on the rear axle of the driven vehicle to the front axle and thus equalize the traction obtainable from both axles. This is achieved by extending the ram 66 from the cylinder 68 while the coupling is connected between the vehicles, thus easing the load from the rear axle. It is impossible to lift the rear wheels off the ground since there is a pressure relief associated with the cylinder to limit the pressure applied to the ram.

Having thus described the invention what is claimed is:

1. A coupling for interconnecting wheeled vehicles comprising a first member; means for pivotally mounting said first member to a first vehicle, such as a tractor, to provide movement about a substantially horizontal axis; a second member; means for attaching said second member to a second vehicle, such as a trailer; and means for raising and lowering said first member between a coupling position with said second member and a lowered uncoupled position, said first member comprising spigot means; a housing carried by said spigot means for movement about a substantially horizontal axis; a further member connected to said housing to permit movement about a substantially vertical axis; jacking means carried by said second member movable between a jacking position and a released position; a locating box carried by said first member; a push rod associated with said second member for moving said jacking means from said jacking position to said released position, said push rod engageable by said locating box upon raising of said first member whereby said locating box raises and actuates said push rod to move jacking means from said jacking position to said released position.

2. A coupling as defined in claim 1, comprising spring means for returning said jacking means to said jacking position on lowering of said first member away from said push rod.

* * * * *